US012769106B2

(12) United States Patent
Lin

(10) Patent No.: US 12,769,106 B2
(45) Date of Patent: Oct. 20, 2026

(54) MICROSCOPIC OPERATING DEVICE FOR PERFORMING MICROSCOPIC IMAGE CAPTURING AND PROCESSING OF BIOSAMPLES IN SAMPLE CONTAINER

(71) Applicant: Ta-Chin Lin, Tainan City (TW)

(72) Inventor: Ta-Chin Lin, Tainan City (TW)

( * ) Notice: Subject to any disclaimer, the term of this patent is extended or adjusted under 35 U.S.C. 154(b) by 259 days.

(21) Appl. No.: 18/578,104

(22) PCT Filed: Aug. 4, 2023

(86) PCT No.: PCT/CN2023/111241

§ 371 (c)(1),
(2) Date: Jan. 10, 2024

(87) PCT Pub. No.: WO2024/027826

PCT Pub. Date: Feb. 8, 2024

(65) Prior Publication Data

US 2025/0093635 A1 Mar. 20, 2025

Related U.S. Application Data

(60) Provisional application No. 63/395,272, filed on Aug. 4, 2022.

(51) Int. Cl.
*G02B 21/26* (2006.01)
*G02B 21/36* (2006.01)

(52) U.S. Cl.
CPC ........... *G02B 21/26* (2013.01); *G02B 21/361* (2013.01); *G02B 21/362* (2013.01)

(58) Field of Classification Search
CPC ................................ G02B 21/26; G02B 21/36
See application file for complete search history.

(56) References Cited

U.S. PATENT DOCUMENTS

| | | | | |
|---|---|---|---|---|
| 4,601,551 | A | 7/1986 | Pettingell et al. | |
| 4,756,611 | A | 7/1988 | Yonekubo et al. | |
| 2013/0077158 | A1 * | 3/2013 | Matsumoto | G02B 21/0088 359/379 |
| 2018/0348497 | A1 * | 12/2018 | Sakamoto | G02B 21/26 |

FOREIGN PATENT DOCUMENTS

| | | | | |
|---|---|---|---|---|
| CN | 102744590 A | 10/2012 | | |
| CN | 103128731 A | 6/2013 | | |
| CN | 105598694 A | 5/2016 | | |
| CN | 10-6271587 | * | 1/2017 | G02B 21/22 |
| CN | 106271587 A | 1/2017 | | |
| CN | 20-6363003 | * | 7/2017 | G02B 21/22 |

* cited by examiner

*Primary Examiner* — Lauren Nguyen
(74) *Attorney, Agent, or Firm* — Muncy, Geissler, Olds & Lowe, P.C.

(57) ABSTRACT

A microscopic operating device includes a microscopically image capturing mechanism and a processing mechanism mounted on the seat mechanism. The microscopically image capturing mechanism includes a microscopically image capturing unit moved and adjusted in an up-down direction and having two microscope lenses. The processing mechanism is actuated to move downwardly to reach a field of view of the microscope lenses and to process to biosamples in a sample container. With the two microscope lenses and a processing unit of the processing mechanism, the position of the processing unit relative to the biosamples can be observed from different angles so as to conduct a precise processing procedure.

12 Claims, 9 Drawing Sheets

MICROSCOPIC OPERATING DEVICE FOR PERFORMING MICROSCOPIC IMAGE CAPTURING AND PROCESSING OF BIOSAMPLES IN SAMPLE CONTAINER

FIELD

The disclosure relates to a microscopic operating device, and more particularly to a microscopic operating device for performing microscopic image capturing and processing biosamples in a sample container.

BACKGROUND

In artificial reproduction, an ovum is fertilized in vitro, and the fertilized ovum is implanted into the mother's uterus and grows. During artificial insemination, medical personnel select the motile sperm or ovum from a sample container, or take out the fertilized ovum from the sample container. Microscopic imaging technology is utilized to find the desired sperm, ova or fertilized ova from the sample container. Subsequently, with the aid of microscopic images, a tip of a micropipette is manually registered with a corresponding position in the sample container to extract the desired sperm, ova or fertilized ova. However, through such manually manipulation method, it is difficult to perform an accurate and timely sampling operation and other processing operation owing to individually different skillfulness. Also, it is impossible to do without bleaching the favorable environment due to an open space is needed for manually operation.

SUMMARY

Therefore, an object of the disclosure is to provide a microscopic operating device that can alleviate at least one of the drawbacks of the prior art.

According to the disclosure, the microscopic operating device for performing microscopic image capturing and processing of biosamples in a sample container includes a seat mechanism, a microscopic image capturing mechanism and a processing mechanism which are mounted on the seat mechanism with a rotary angulator. The microscopic image capturing mechanism includes a first height adjusting unit which is mounted on the seat mechanism, and a microscopic image capturing unit which is mounted on the first height adjusting unit. The first height adjusting unit is controlled and actuated to move the microscopic image capturing unit relative to the sample container in an up-down direction. The microscopic image capturing unit includes two microscope lenses which are spaced apart from each other and which respectively have optical axes that extend to intersect each other. Each of the microscope lenses is disposed to microscopically capture images of the biosamples in the sample container. The processing mechanism includes a second height adjusting unit which is mounted on the seat mechanism, and a processing unit which is operable to process the biosamples in the sample container. The second height adjusting unit is controlled and actuated to move the processing unit relative to the sample container in the up-down direction and to move the processing unit downwardly to reach a field of view of the microscope lenses and into the sample container.

With the microscope lenses of the microscopic image capturing mechanism and the processing unit of the processing mechanism adjustable and movable to be placed within the field of view of the microscope lenses, during the processing procedure, the position of the processing unit relative to the biosamples in the sample container can be observed from different angles by the microscope lenses so as to conduct a precise processing procedure.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
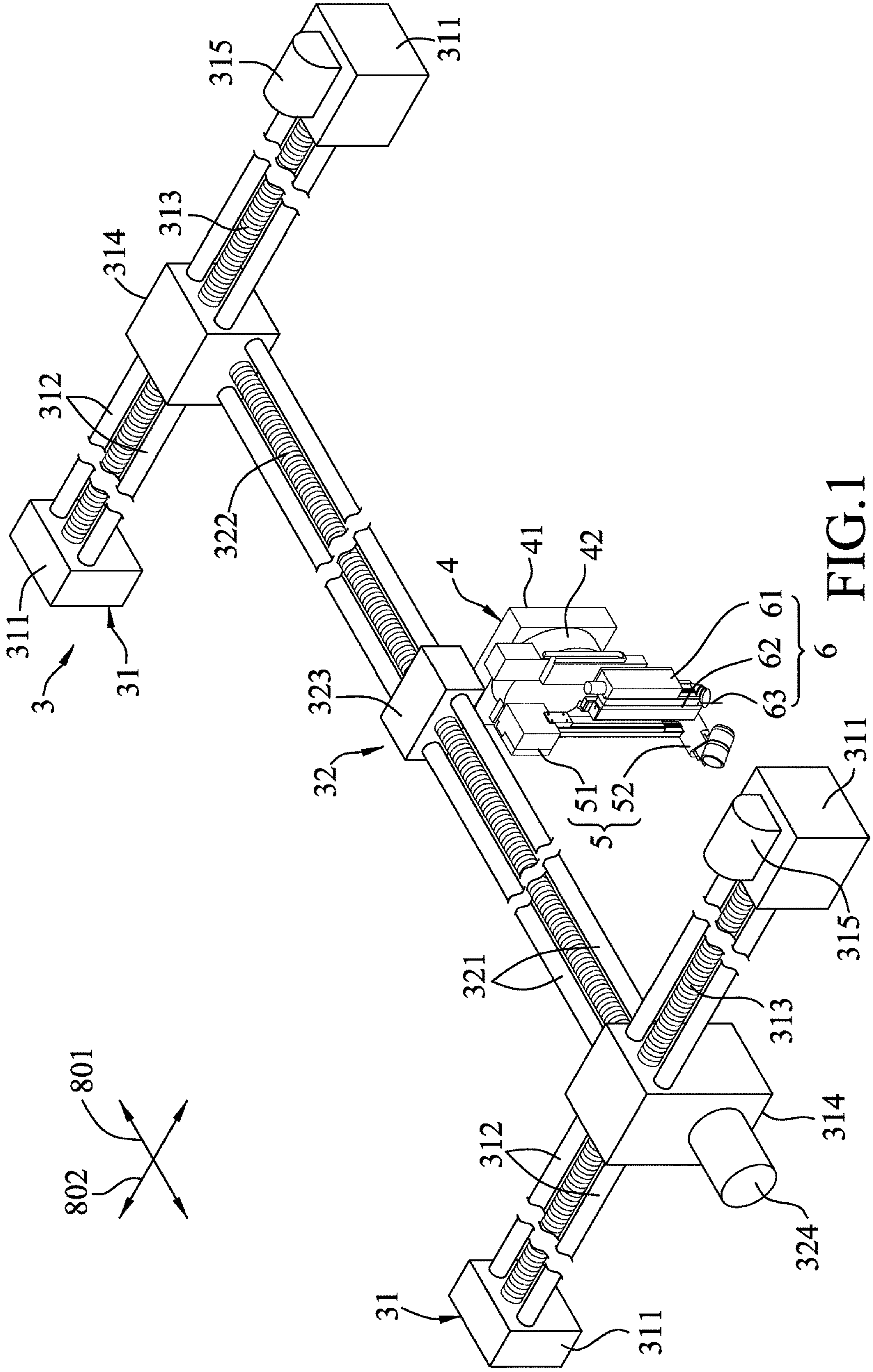
FIG. 1 is a fragmentary perspective view illustrating an embodiment of a microscopic operating device according to the disclosure.
Figure 2:
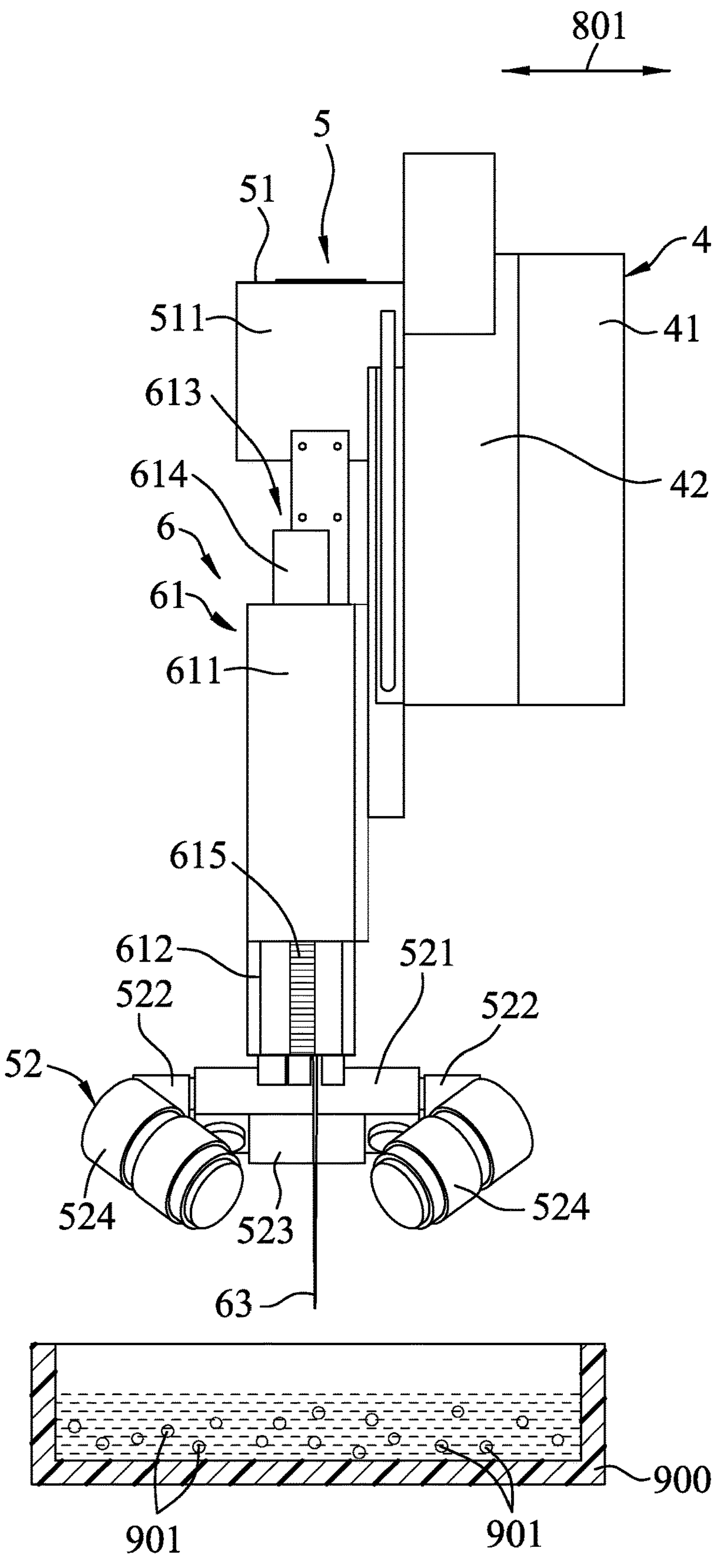
FIG. 2 is a schematic partly-sectioned side view of a microscopic image capturing mechanism and a processing mechanism of the embodiment, illustrating the state when a sample container with biosamples therein is disposed during operation.
Figure 5:
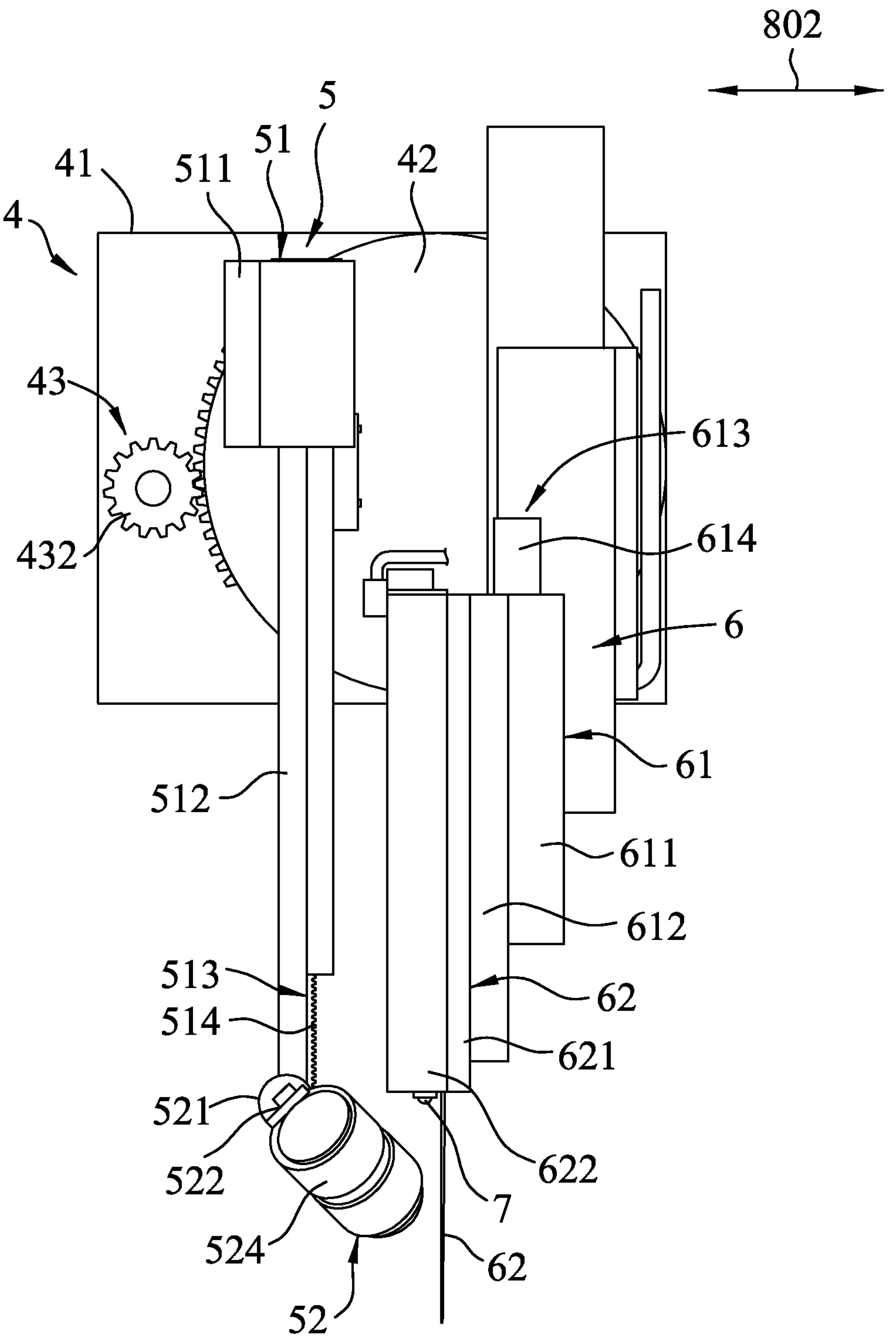
FIG. 5 is a schematic front view of the embodiment.

Referring to FIGS. 1 and 2, an embodiment of a microscopic operating device is for performing microscopic image capturing of biosamples 901 and processing biosamples 901 in a sample container 900, such as biosample taking, injection, etching, laser beam perforation, etc. The biosamples 901 may be sperm, ova or fertilized ova. The microscopic operating device includes a movement adjusting mechanism 3, a seat mechanism 4 which is mounted on the movement adjusting mechanism 3, a microscopic image capturing mechanism 5 which is mounted on the seat mechanism 4, a processing mechanism 6 which is mounted on the seat mechanism 4, and a tip camera 7 (see FIG. 5) which is mounted on the processing mechanism 6.

The movement adjusting mechanism 3 includes two first movement adjusting modules 31 which are spaced apart from and aligned with each other in a first direction 801 and each of which extends in a second direction 802 that is orthogonal to the first direction 801, and a second movement adjusting module 32 which extends in the first direction 801 and bridges the first movement adjusting modules 31.

Each first movement adjusting module 31 includes two first stands 311 which are spaced apart from each other in the second direction 802, two first guide rails 312 which extend in the second direction 802 to bridge and be supported by the first stands 311 and which are spaced apart from each other in the first direction 801, a first transmission screw 313 which extends in the second direction 802 to bridge and be supported by the first stands 311 and which is spaced apart from the first guide rails 312, a first slider 314 which is movably sleeved on the first guide rails 312 and which is threadedly engaged with the first transmission screw 313, and a first driver 315 which is mounted on either one of the first stands 311 and which is coupled with the first transmission screw 313 to drive rotation of the first transmission screw 313. A torque generated as a result of rotation of the first transmission screw 313 actuated by the first driver 315 is transmitted to drive movement of the first slider 314 along the first guide rails 312 in the second direction 802.

The second movement adjusting module 32 bridges the first sliders 314 of the first movement adjusting modules 31 to be moved with the first sliders 314 in the second direction 802. The second movement adjusting module 32 includes two second guide rails 321 which extend in the first direction 801 to bridge the first sliders 314 and which are spaced apart from each other in the first direction 801, a second transmission screw 322 which extends in the first direction 801 and which rotatably bridges the first sliders 314, a second slider 323 which is movably sleeved on the second guide rails 321 and which is threadedly engaged with the second transmission screw 322, and a second driver 324 which is mounted on either one of the first sliders 314 and which is coupled with the second transmission screw 322 to drive rotation of the second transmission screw 322. A torque generated as a result of rotation of the second transmission screw 322 actuated by the second driver 324 is transmitted to drive movement of the second slider 323 along the second guide rails 321 in the first direction 801.

In this embodiment, each of the first driver 315 and the second driver 324 is composed of a drive motor, such as a step motor, and a gear speed reducer. Since the construction of the first and second drivers 315, 324 is of a known type, a detailed description thereof is dispensed with.

With reference to FIGS. 1, 3, 4 and 5, the seat mechanism 4 is mounted on the second slider 323 to be moved horizontally with the second slider 323. The seat mechanism 4 includes a mounting seat 41 which is mounted below the second slider 323, a rotary seat 42 which is rotatably mounted on the mounting seat 41 about a horizontal axis in the first direction 801, and a rotation driver 43 which is mounted on the mounting seat 41 and coupled with the rotary seat 42. The rotation driver 43 is operable to actuate rotation of the rotary seat 42 relative to the mounting seat 41.

In this embodiment, the rotation driver 43 includes a torque drive motor 431 which is securely mounted on the mounting seat 41, and a gear speed reducer 432 which is disposed between the toque drive motor 431 and the rotary seat 42. For example, the torque drive motor 431 is a step motor which drives the rotation of the rotary seat 42 relative to the mounting seat 41.

Figure 3:
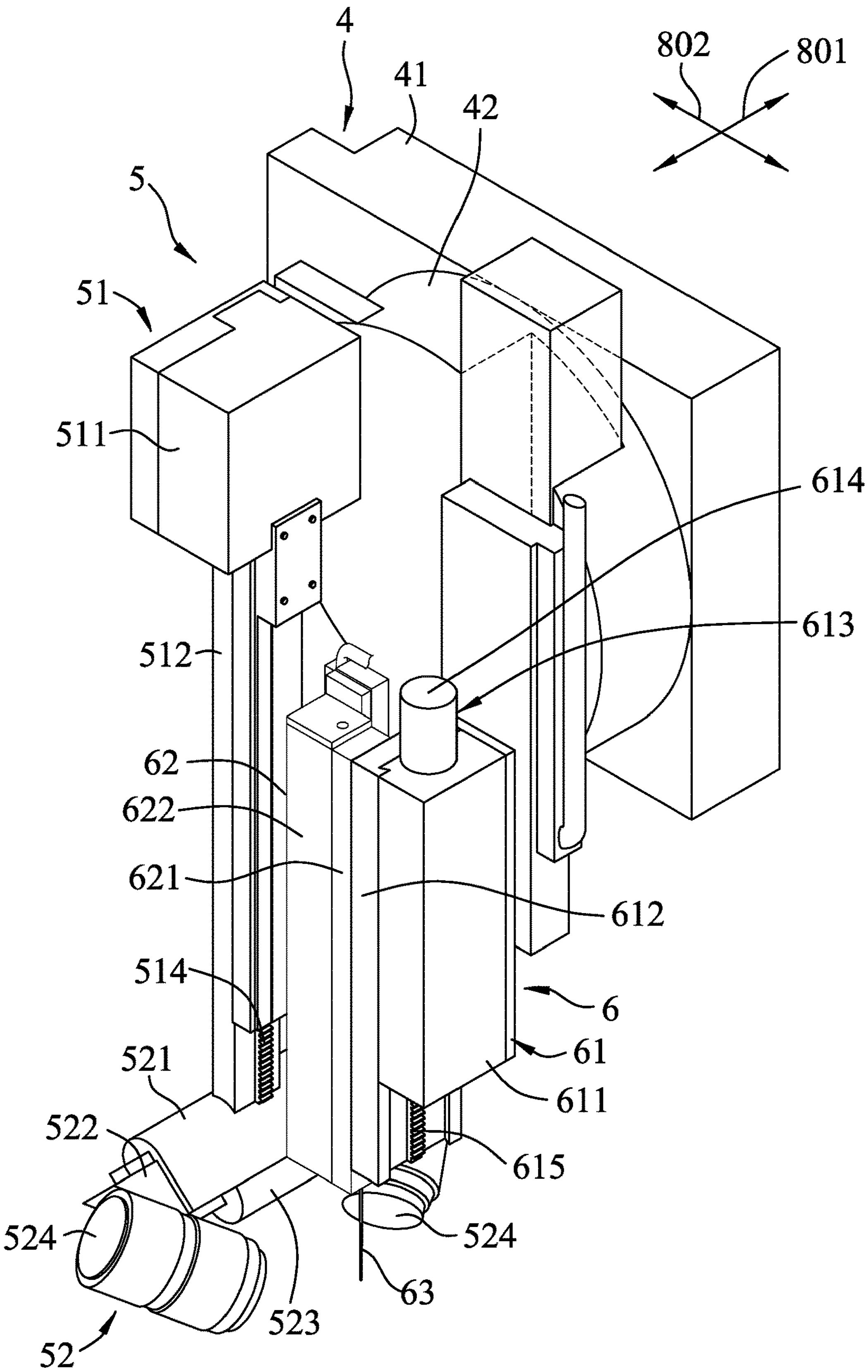
FIG. 3 is a perspective view of the embodiment.
Figure 4:
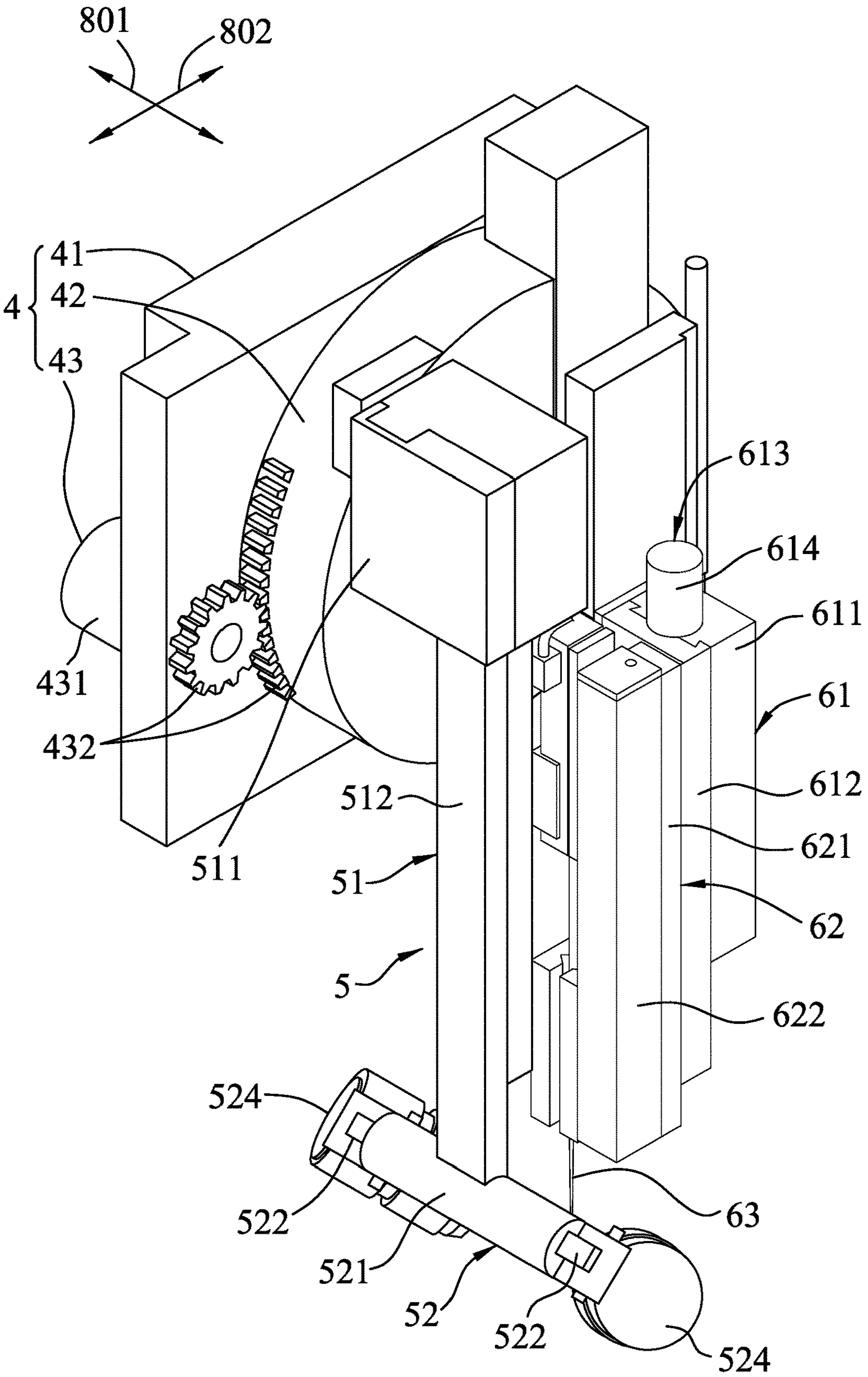
FIG. 4 is a perspective view of the embodiment, taken from another angle.
Figure 6:
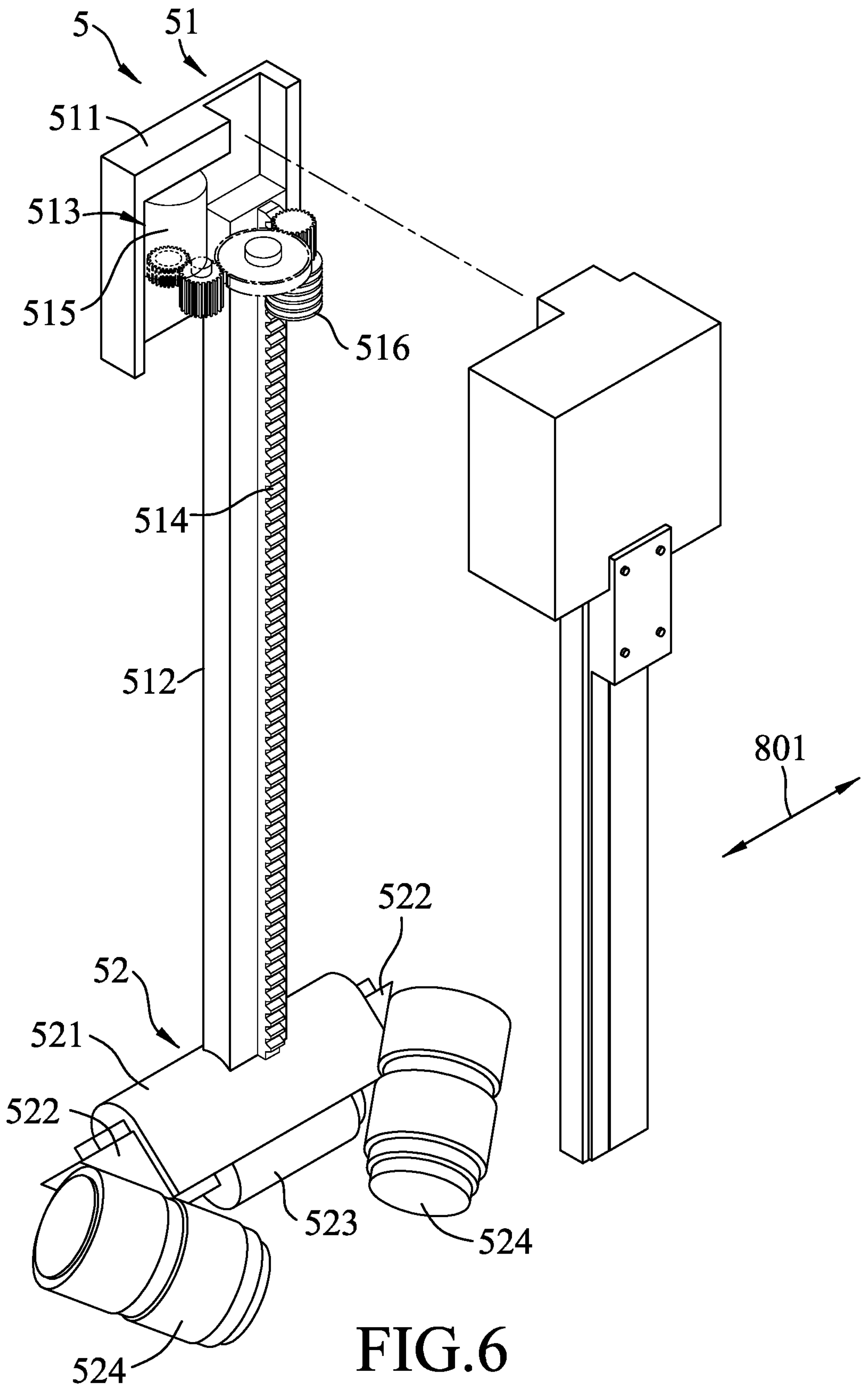
FIG. 6 is an exploded perspective view illustrating the microscopic image capturing mechanism of the embodiment.

With reference to FIGS. 2, 3 and 6, the microscopic image capturing mechanism 5 is mounted on the rotary seat 42 to be rotated with the rotary seat 42. The microscopic image capturing mechanism 5 includes a first height adjusting unit 51 which is mounted on the rotary seat 42, and a microscopic image capturing unit 52 which is mounted on the first height adjusting unit 51.

The first height adjusting unit 51 includes a first housing 511 which is securely mounted on the rotary seat 42, a first height adjusting driver 513 which is mounted on the first housing 511, a first holder 512 which is movably mounted on the first housing 511 and which is coupled with and actuated by the first height adjusting driver 513 to move relative to the first housing 511 in an up-down direction that is transverse to both the first direction 801 and the second direction 802. Specifically, the first height adjusting driver 513 includes a first transmission rack 514 which is securely disposed on the first holder 512 and which extends in the up-down direction, a first drive motor 515 which is mounted within the first housing 511, and a gear speed reducer 516 which is coupled with the first drive motor 515 and which meshes with the first transmission rack 514. The first drive motor 515 is controlled and operated to transmit a drive through the gear speed reducer 516 and the first transmission rack 514 to move the first holder 512 relative to the first housing 511 in the up-down direction so as to adjust the downward extending length of the first holder 512 relative to the first housing 511. In this embodiment, the first drive motor 515 is a step motor which is coupled with the gear speed reducer 516 to minutely adjust the height of the first holder 512.

The microscopic image capturing unit 52 includes a suspending arm 521 which is mounted on a lower end of the first holder 512 and which extends in the first direction 801 to have two opposite ends, two shafts 522 which are telescopically mounted on the suspending arm 521 and which respectively extend from the ends in the first direction 801, a driving module 523 which is mounted on the suspending arm 521 and which are coupled with the shafts 522, and two microscope lenses 524 which are respectively mounted on the shafts 522.

The driving module 523 is controlled and operated to actuate the telescopic movements of the shafts 522 relative to the suspending arm 521 so as to adjust the extending lengths of the shafts 522 and hence adjust the horizontal positions of the microscope lenses 524 in the first direction 801. The driving module 523 is composed of a drive motor and gear speed reducer assemblies coupled with the drive motor and the shafts 522. Since the construction of the driving module 523 is of a known type, a detailed description thereof is dispensed with.

The microscope lenses 524 are electronic microscope lenses which microscopically capture images, and sends the captured images to a display device (not shown) for processing and display output.

Each of the microscope lenses 524 is disposed to microscopically capture images of the biosamples 901 in the sample container 900. In this embodiment, the microscope lenses 524 respectively have optical axes which extend and are inclined toward the second direction 802 and which extend downwardly and toward each other to intersect each other at a lower portion of the processing mechanism 6. In other embodiments, the optical axes of the microscope lenses 524 intersect by an adjustable angle, such as 45 degrees, 90 degrees, etc. Moreover, through the adjustment of the shafts 522 relative to the suspending arm 521, the direction of the optical axes of the microscope lenses 524 may be adjusted.

Figure 7:
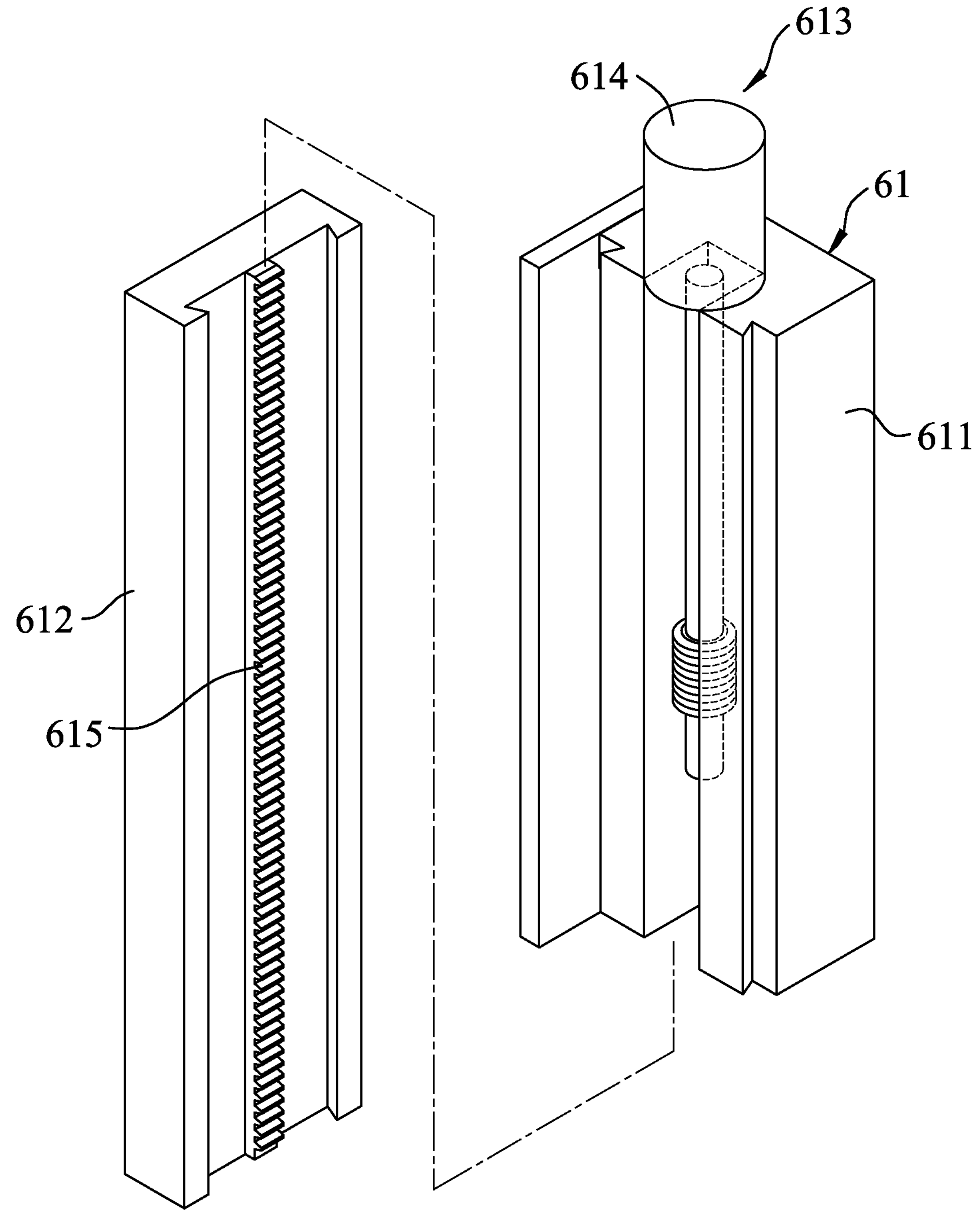
FIG. 7 is an exploded perspective view illustrating a second height adjusting unit of the processing mechanism of the embodiment.
Figure 8:
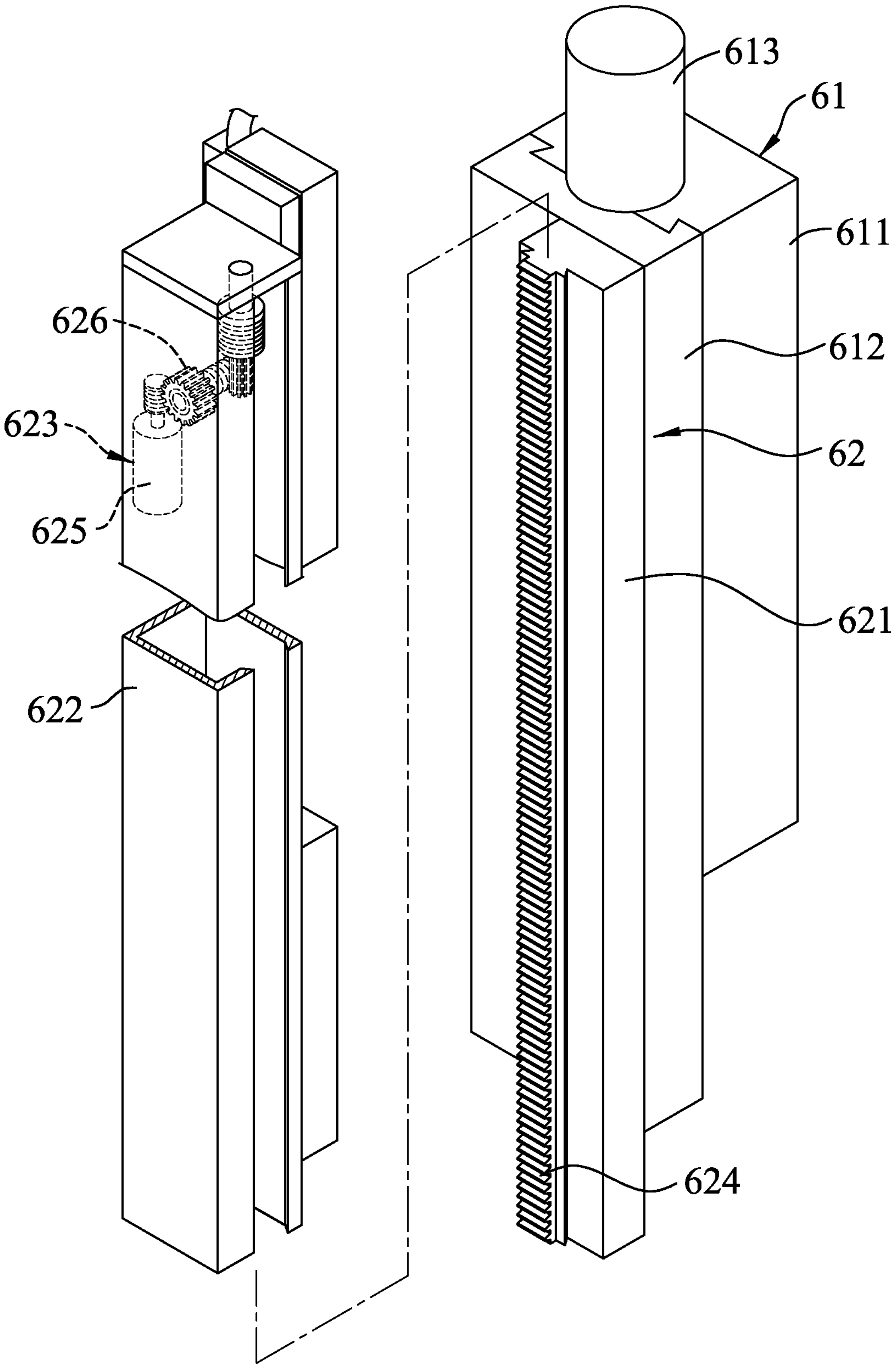
FIG. 8 is an exploded perspective view illustrating a third height adjusting unit of the processing mechanism of the embodiment.

With reference to FIGS. 3, 7 and 8, the processing mechanism 6 is mounted on the rotary seat 42 to be rotated with the rotary seat 42. The processing mechanism 6 includes a second height adjusting unit 61 which is mounted on the rotary seat 42, a third height adjusting unit 62 which is mounted on the second height adjusting unit 61, and a processing unit 63 which is mounted on the third height adjusting unit 62.

Specifically, the second height adjusting unit 61 includes a second housing 611 which is securely mounted on the rotary seat 42 and which extends in the up-down direction, a second holder 612 which is movably mounted on the second housing 611 in the up-down direction and which is connected with the third height adjusting unit 62, and a second height adjusting driver 613 which is mounted on the second housing 611 and which is coupled with the second holder 612. The second height adjusting driver 613 includes a second drive motor 614 which is mounted on an upper end of the second housing 611, and a second transmission rack 615 which is securely mounted on the second holder 612 and which extends in the up-down direction. The second drive motor 614 is coupled with the second transmission rack 615 and is controlled and actuated to transmit a drive through the second transmission rack 615 to move the second holder 612 relative to the second housing 611 in the up-down direction so as to adjust the downward extending length of the second holder 612 relative to the second housing 611. In this embodiment, the second drive motor 614 is a step motor.

The third height adjusting unit 62 is mounted between the second height adjusting unit 61 and the processing unit 63. The third height adjusting unit 62 includes a third housing 621 which is securely mounted on the second holder 612, a third holder 622 which is movably mounted on the third housing 621 in the up-down direction, and a third height adjusting driver 623 which is mounted on the third holder 622 and which is coupled with the third housing 621. The third height adjusting driver 623 includes a third transmission rack 624 which is securely mounted on the third housing 621 and which extends in the up-down direction, a third drive motor 625 which is mounted on the third holder 622, and a gear speed reducer 626 which is mounted on the third holder 622 and which is coupled with the third drive motor 625 and the third transmission rack 624.

The third drive motor 625 is controlled and operated to actuate movement of the third holder 622 relative to the third housing 621 in the up-down direction through the gear speed reducer 626 and the third transmission rack 624.

The processing unit 63 is mounted on the second holder 612. Thus, the third height adjusting unit 62 is controlled and actuated to move the processing unit 63 relative to the sample container 900 in the up-down direction. The second height adjusting unit 61 is driven to move the processing unit 63 in the up-down direction through the third height adjusting unit 62.

In this embodiment, the tooth pitch of the third transmission rack 624 is smaller than that of the second transmission rack 615. That is, the processing unit 63 is moved by the second height adjusting unit 61 with a moving route that is different from a moving route with which the processing unit 63 is moved by the third height adjusting unit 62. Specifically, by the second height adjusting driver 613, the second holder 612 is adjusted and moved at a relatively larger range. By the third height adjusting driver 623, the third holder 622 is adjusted and moved at a relatively minor range.

The processing unit 63 may be in the form of a tube which is connected and in communication with a driving equipment (not shown), or an electronic device which is in signal connection with a driving equipment (not shown). For example, the processing unit 63 may be a sampling cannula, an injection syringe, a laser device, an etching device, etc.

The processing unit 63 is movable downwardly with the second holder 612 to be interposed between the microscope lenses 524 and to reach a field of view of the microscope lenses 524 and into the sample container 900. Also, the processing unit 63 is operable and driven to perform suction, injection, etching or perforation process on the biosamples 901 in the sample container 900. The injection process may include a process of injecting sperm, DNA, cell tissues, etc. Besides, the processing unit 63 may be adapted, but not limited, to hold an injection unit, a pipette unit, a piezoelectric unit, a laser unit, etc.

The tip camera 7 is mounted on a bottom end of the third holder 622, and has a vision which is parallel to the direction of the processing unit 63 to capture image of the bottom portion of the processing unit 63 to feedback the captured vision in the tip camera 64 for facilitating positioning of the processing unit 63 and monitoring the operation of the processing unit 63.

With reference to FIGS. 1 and 2, when the microscopic operating device is operated to perform a processing operation on the biosamples 901 in the sample container 900 therebelow, the first drivers 315 and the second driver 324 of the movement adjusting mechanism 3 are operated to adjust the position of the second movement adjusting module 32 in the second direction 802 and further adjust the position of the second slider 323 in the first direction 801 such that the seat mechanism 4 is moved to bring the microscopic image capturing mechanism 5 and the processing mechanism 6 to a desired horizontal position above the sample container 900.

Figure 9:
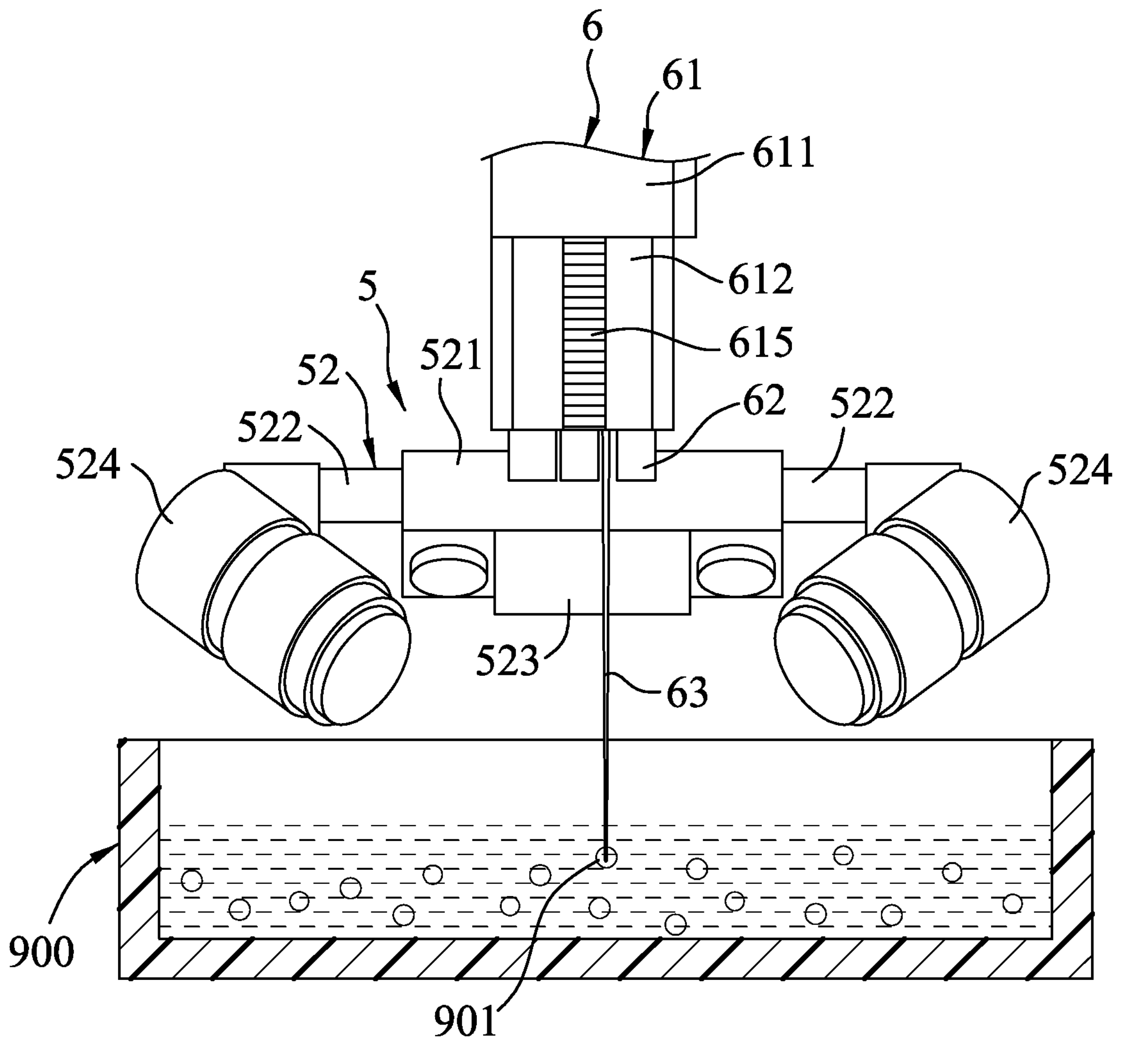
FIG. 9 is a fragmentary partly-sectioned side view illustrating the embodiment during operation.

With reference to FIGS. 2, 6 and 9, subsequently, the first height adjusting driver 513 is operated to move the microscopic image capturing unit 52 downwardly through the first height adjusting unit 51 such that the sample container 900 is placed within the field of view of the microscope lenses 524. Also, according to the imaging requirement, the driving module 523 is operated to actuate movement of the shafts 522 in the first direction 801 so as to adjust the field of view of each microscope lens 524. Moreover, with the operation of the rotation driver 43 to actuate rotation of the rotary seat 42, an angular movement of the first height adjusting unit 51 and the second height adjusting unit 61 is actuated for further adjusting the fields of view of the microscope lenses 524.

When the microscopic operating device is operated to perform a processing operation to the biosamples 901 in the sample container 900, the second height adjusting unit 61 is operated to move the second holder 612 downwardly, and the third height adjusting unit 62 and the processing unit 63 are moved rapidly so as to place the processing unit 63 in the field of view of the microscope lenses 524. Hence, the position of the processing unit 62 relative to the biosamples 901 in the sample container 900 can be observed from different angles. Meanwhile, cooperating with the tip camera which captures the image of the bottom portion of the processing unit 63, the position of the processing unit 63 relative to the biosample 901 to be processed is observed to monitor the operation of the processing unit 63.

Subsequently, through operation of the third height adjusting driver 623 of the third height adjusting unit 62 (see FIG. 8), the processing unit 63 is minutely moved downwardly relative to the biosamples 901 in the sample container 900. The user, with the aid of the microscopic images captured by the microscope lenses 524, can precisely operate the third height adjusting driver 623 so as to perform the processing procedure on the predetermined biosamples 901, such as sampling, injection, etching, perforation, etc.

With reference to FIG. 1, moreover, through the movement adjusting mechanism 3 which is movable to adjust the seat mechanism 4, the microscopic image capturing mechanism 5 and the processing mechanism 6 in the first direction 801 and the second direction 802, a plurality of the sample containers 900 with biosamples 901 therein can be placed below the processing mechanism 6 and spaced apart from each other. Then, with the horizontal adjustment of the seat mechanism 4 by means of the movement adjusting mechanism 3, the microscopic image capturing mechanism 5 and the processing mechanism 6 are adjusted synchronously relative to the sample containers 900 so as to perform the processing procedure on each sample container 900.

As illustrated, with the microscope lenses 524 of the microscopic image capturing mechanism 5 and the processing unit 63 of the processing mechanism 6 adjustable and movable to be placed within the field of view of the microscope lenses 524, during the processing procedure, the position of the processing unit 63 relative to the biosamples 901 in the sample container 900 can be observed from different angles by the microscope lenses 524 so as to conduct a precise processing procedure. Further, through the second height adjusting unit 61 and the third height adjusting unit 62 with different moving routes, the processing unit 63 can be adjusted by a larger range and more rapidly by the second height adjusting unit 61, and adjusted by a smaller range by the third height adjusting unit 62.

Further, with the seat mechanism 4 operable to angularly move the microscopic image capturing mechanism 5 and the processing mechanism 6, the processing unit 63 can be adjusted to be inclined relative to the biosamples 901 in the sample container 900 by different inclined angles. Furthermore, with the movement adjusting mechanism 3 for adjusting the microscopic image capturing mechanism 5 and the processing mechanism 6 in both the first direction 801 and the second direction 802, a sampling operation on a plurality of sample containers 900 can be conveniently performed.

Moreover, with the movement adjusting mechanism 3, the seat mechanism 4, the microscopic image capturing mechanism 5 and the processing mechanism 6, the microscopic operating device is suitable for intelligent control with automation equipment.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A microscopic operating device for performing microscopic image capturing and processing of biosamples in a sample container, comprising:

a seat mechanism including a mounting seat;

a microscopic image capturing mechanism including a first height adjusting unit which is mounted on said seat mechanism, and a microscopic image capturing unit which is mounted on said first height adjusting unit, said first height adjusting unit being controlled and actuated to move said microscopic image capturing unit relative to the sample container in an up-down direction, said microscopic image capturing unit including two microscope lenses which are spaced apart from each other and which respectively have optical axes that extend to intersect each other, each of said microscope lenses being disposed to microscopically capture images of the biosamples in the sample container;

a processing mechanism including a second height adjusting unit which is mounted on said seat mechanism, and a processing unit which is operable to process the biosamples in the sample container, said second height adjusting unit being controlled and actuated to move said processing unit relative to the sample container in the up-down direction and to move said processing unit downwardly to reach a field of view of said microscope lenses and into the sample container; and a movement adjusting mechanism which is connected with said mounting seat, said movement adjusting mechanism including two first movement adjusting modules which are spaced apart from and aligned with each other in a first direction, and a second movement adjusting module which extends in the first direction and bridges said first movement adjusting modules, said second movement adjusting module being connected with said mounting seat to move said seat mechanism in both the first direction and the second direction relative to the sample container so as to adjust synchronously said two microscope lenses and said processing unit relative to the sample container.

2. The microscopic operating device of claim 1, wherein said microscopic image capturing unit includes a suspending arm which is mounted on said first height adjusting unit and which has two opposite ends, two shafts which are telescopically mounted on said suspending arm and respectively extend from said ends, and a driving module which is mounted on said suspending arm and coupled with said shafts, said driving module being operable to actuate movement of said shafts relative to said suspending arm, said microscope lenses being respectively mounted on said shafts so as to be respectively moved with said shafts relative to each other.

3. The microscopic operating device of claim 1, wherein said seat mechanism further includes a rotary seat which is rotatably mounted on said mounting seat about a horizontal axis, and a rotation driver which is mounted on said mounting seat and coupled with said rotary seat, said first height adjusting unit and said second height adjusting unit being mounted on said rotary seat, said rotation driver being operable to actuate rotation of said rotary seat and angular movement of said first height adjusting unit and said second height adjusting unit for adjusting fields of view of said microscope lenses.

4. The microscopic operating device of claim 3, wherein each of said first movement adjusting modules includes a first transmission screw and a first guide rail which extend in a second direction that is transverse to the first direction and which are spaced apart from each other, a first slider which is movably sleeved on said first guide rail and which is threadedly engaged with said first transmission screw, and a first driver which is coupled with said first transmission screw such that a torque generated as a result of rotation of said first transmission screw actuated by said first driver is transmitted to drive movement of said first slider along said first guide rail in the second direction, said second movement adjusting module bridging said first sliders of said first movement adjusting modules to be moved with said first sliders in the second direction.

5. The microscopic operating device of claim 4, wherein said second movement adjusting module includes a second transmission screw and a second guide rail which extend in the first direction and which are spaced apart from each other to bridge said first sliders, a second slider which is movably sleeved on said second guide rail and which is threadedly engaged with said second transmission screw, and a second driver which is mounted on either one of said first sliders and which is coupled with said second transmission screw, said second slider being connected with said mounting seat such that a torque generated as a result of rotation of said second transmission screw actuated by said second driver is transmitted to drive movement of said second slider along said second guide rail in the first direction.

6. The microscopic operating device of claim 1, wherein said first height adjusting unit includes a first housing which is securely mounted on said seat mechanism, a first height adjusting driver which is mounted on said first housing, a first holder which is movably mounted on said first housing and is actuated by said first height adjusting driver to move relative to said first housing in the up-down direction, said microscopic image capturing unit being mounted on said first holder opposite to said first housing to be moved with said first holder in the up-down direction relative to said first housing.

7. The microscopic operating device of claim 1, wherein said processing mechanism further includes a third height adjusting unit which is mounted between said second height adjusting unit and said processing unit, said third height adjusting unit being controlled and actuated to move said processing unit relative to the sample container in the up-down direction, said second height adjusting unit being driven to move said processing unit in the up-down direction through said third height adjusting unit, said processing unit being moved by said second height adjusting unit with a moving route that is different from a moving route with which said processing unit is moved by said third height adjusting unit.

8. The microscopic operating device of claim 7, wherein said second height adjusting unit includes a second housing which is securely mounted on said seat mechanism, a second holder which is movably mounted on said second housing in the up-down direction, and a second height adjusting driver which is mounted on one of said second housing and said second holder and which is coupled with the other one of said second housing and said second holder, said third height adjusting unit being mounted on said second holder, said second height adjusting driver being controlled and operated to actuate movement of said second holder relative to said second housing in the up-down direction so as to move said third height adjusting unit and said processing unit.

9. The microscopic operating device of claim 8, wherein said second height adjusting driver includes a second transmission rack which is securely mounted on said second holder and which extends in the up-down direction, and a second drive motor which is coupled with said second transmission rack and which is controlled and actuated to transmit a drive through said second transmission rack to move said second holder relative to said second housing in the up-down direction.

10. The microscopic operating device of claim 8, wherein said third height adjusting unit includes a third housing which is securely mounted on said second holder, a third holder which is movably mounted on said third housing in the up-down direction, and a third height adjusting driver which is mounted on one of said third housing and said third holder and which is coupled with the other one of said third housing and said third holder, said processing unit being mounted on said second holder, said third height adjusting driver being controlled and operated to actuate movement of said third holder relative to said third housing in the up-down direction.

11. The microscopic operating device of claim 10, wherein said third height adjusting driver includes a third transmission rack which is securely mounted on said third housing and which extends in the up-down direction, a third drive motor which is mounted on said third holder, and a gear speed reducer which is mounted on said third holder and which is coupled with said third drive motor and said third transmission rack.

12. The microscopic operating device of claim 10, further comprising a tip camera which is mounted on an end of said third holder to capture image of a bottom portion of said processing unit.

* * * * *